(12) United States Patent
Franklin et al.

(10) Patent No.: US 12,210,378 B2
(45) Date of Patent: Jan. 28, 2025

(54) ELECTRONIC DEVICES WITH STRUCTURAL GLASS MEMBERS

(71) Applicant: Apple Inc., Cupertino, CA (US)

(72) Inventors: Jeremy C. Franklin, San Francisco, CA (US); Fletcher R. Rothkopf, Los Altos, CA (US); John P. Ternus, Los Altos Hills, CA (US); Kevin D. Gibbs, San Carlos, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 18/233,362

(22) Filed: Aug. 14, 2023

(65) Prior Publication Data

US 2023/0384824 A1 Nov. 30, 2023

Related U.S. Application Data

(63) Continuation of application No. 17/748,958, filed on May 19, 2022, now Pat. No. 11,768,517, which is a continuation of application No. 16/886,532, filed on May 28, 2020, now Pat. No. 11,340,653, which is a continuation of application No. 16/138,913, filed on Sep. 21, 2018, now Pat. No. 10,712,774, which is a continuation of application No. 15/840,913, filed on Dec. 13, 2017, now Pat. No. 10,691,165, which is a continuation of application No. 13/310,409, filed on Dec. 2, 2011, now Pat. No. 9,864,403.

(51) Int. Cl.
*G06F 1/16* (2006.01)
(52) U.S. Cl.
CPC .................................. *G06F 1/1626* (2013.01)

(58) Field of Classification Search
CPC ..................................................... G06F 1/1626
USPC ...................................................... 349/58–60
See application file for complete search history.

(56) References Cited

U.S. PATENT DOCUMENTS

| | | | |
|---|---|---|---|
| 6,246,459 B1 | 6/2001 | Simhambhatla et al. |
| 6,643,224 B1 | 11/2003 | Sekiguchi et al. |
| 6,952,530 B2 | 10/2005 | Helvajian et al. |
| 8,724,304 B2 | 5/2014 | Raff et al. |

(Continued)

FOREIGN PATENT DOCUMENTS

| | | |
|---|---|---|
| WO | WO 2009/057102 | 5/2009 |
| WO | WO 2011/096958 | 8/2011 |

*Primary Examiner* — Charles S Chang
(74) *Attorney, Agent, or Firm* — Brownstein Hyatt Farber Schreck, LLP

(57) ABSTRACT

Electronic devices may be provided having internal components mounted to a structural glass support member. The structural glass support member may have a planar front surface that forms a front surface of the device. The structural glass support member may have bent portions that form sidewall surfaces of the device. Portions of the structural glass support member may form a transparent display cover layer. A rigid or flexible display may be mounted to the structural glass support member. Additional internal device components may be mounted to the display. A thin enclosure for enclosing the internal components in the device may be mounted to the structural glass support member. The thin enclosure may be mounted to the structural glass support member using a peripheral member. The thin enclosure may be free from attachments to internal components or may be adhesively bonded to one or more internal components.

20 Claims, 19 Drawing Sheets

(56) References Cited

U.S. PATENT DOCUMENTS

| | | |
|---|---|---|
| 8,885,116 B2 | 11/2014 | Bayne et al. |
| 2004/0189196 A1* | 9/2004 | Cok .................... H10K 50/846 |
| | | 313/512 |
| 2005/0014022 A1* | 1/2005 | Park .................... H10K 50/846 |
| | | 428/917 |
| 2005/0233125 A1 | 10/2005 | Anderson et al. |
| 2005/0285991 A1 | 12/2005 | Yamazaki |
| 2006/0125981 A1* | 6/2006 | Okuda .............. G02F 1/133308 |
| | | 349/110 |
| 2006/0273304 A1 | 12/2006 | Cok et al. |
| 2007/0190274 A1 | 8/2007 | Hamaguchi et al. |
| 2008/0146285 A1 | 6/2008 | Lee et al. |
| 2008/0236007 A1 | 10/2008 | Au et al. |
| 2009/0003141 A1 | 1/2009 | Ozawa et al. |
| 2009/0015747 A1 | 1/2009 | Nishizawa et al. |
| 2009/0175020 A1 | 7/2009 | Zadesky et al. |
| 2010/0014232 A1 | 1/2010 | Nishimura |
| 2010/0061040 A1 | 3/2010 | Dabov et al. |
| 2010/0117975 A1 | 5/2010 | Cho |
| 2010/0296027 A1 | 11/2010 | Matsuhira et al. |
| 2010/0315570 A1 | 12/2010 | Mathew et al. |
| 2011/0049139 A1 | 3/2011 | Jiang et al. |
| 2011/0148784 A1 | 6/2011 | Lee |
| 2011/0164372 A1 | 7/2011 | McClure et al. |
| 2011/0235281 A1 | 9/2011 | Mittleman |
| 2011/0261002 A1 | 10/2011 | Verthein et al. |
| 2012/0050958 A1 | 3/2012 | Sanford et al. |
| 2012/0242926 A1 | 9/2012 | Hsu et al. |
| 2013/0076612 A1 | 3/2013 | Myers et al. |
| 2013/0076649 A1 | 3/2013 | Myers et al. |
| 2013/0083491 A1 | 4/2013 | Rappoport et al. |

\* cited by examiner

ELECTRONIC DEVICES WITH STRUCTURAL GLASS MEMBERS

CROSS-REFERENCE TO RELATED APPLICATION(S)

This application is a continuation patent application of U.S. patent application Ser. No. 17/748,958, filed May 19, 2022 and titled "Electronic Devices with Structural Glass Members," which is a continuation patent application of U.S. patent application Ser. No. 16/886,532, filed May 28, 2020 and titled "Electronic Devices with Structural Glass Members," now U.S. Pat. No. 11,340,653, which is a continuation patent application of U.S. patent application Ser. No. 16/138,913, filed Sep. 21, 2018 and titled "Electronic Devices with Structural Glass Members," now U.S. Pat. No. 10,712,774, which is a continuation of U.S. patent application Ser. No. 15/840,913, filed Dec. 13, 2017 and titled "Electronic Devices with Structural Glass Members," now U.S. Pat. No. 10,691,165, which is a continuation patent application of U.S. patent application Ser. No. 13/310,409, filed Dec. 2, 2011 and titled "Electronic Devices with Structural Glass Members," now U.S. Pat. No. 9,864,403, the disclosures of which are hereby incorporated by reference herein in their entireties.

BACKGROUND

This relates generally to electronic devices, and more particularly, to electronic devices having structural glass support members.

Electronic devices such as portable computers and cellular telephones are often provided with rigid housings made from plastic, metal or composite materials that serve as support structures for device components. A rigid housing commonly serves as the primary mounting structure onto which device components are assembled. Internal components such as batteries, printed circuit boards and displays are commonly mounted to the rigid housings. Transparent display cover layers made from plastic or glass are typically mounted to the rigid housing. Device components such as display cover layers are often mounted to rigid housings using adhesives or mechanical mounting members.

Mounting device components to rigid housing support structures puts various functional requirements such as requirements on rigidity, strength, and shape of the rigid housing. Mounting device components to rigid housing support structures may require additional mechanical components for mounting components to the rigid housing support structures. Functional requirements on rigid housing support structures and additional mechanical components mounted in the rigid housing may increase the volume, width, height, or depth of a device making the device less aesthetically pleasing and less desirable to consumers in a market that values lighter, thinner devices.

It would therefore be desirable to provide improved electronic devices having simplified housing structures.

SUMMARY

Electronic devices may be provided with structural glass support members. A structural glass support member may be configured to form a planar front surface for the device. The structural glass support member may be configured to form planar rear and sidewall surfaces for the device. Internal device components may be mounted to the structural glass support members. The structural glass support members may function as a primary structural member for the device.

The electronic device may have a rigid or flexible display. The rigid or flexible display may be mounted on an internal surface of the structural glass support member. The structural glass support member may form a transparent cover layer for the flexible display so that the display is visible through the structural glass support member. The display may include multiple display layers attached to each other using adhesive. Adhesive bonds between display layers may be able to support mounting of device components to the display. Displays may include a touch-sensitive layer that allows a user to provide touch input to an electronic device. Display pixels on a display may be used to display visual information to the user through the structural glass support member.

The electronic device may have internal components such as batteries, printed circuit boards, rigid or flexible integrated circuits or other components. Internal components may be mounted to the display using adhesive materials or other mounting mechanisms.

The electronic device may have an enclosure attached to the structural glass support member. The enclosure may be a cosmetic covering that blocks internal components mounted to the structural glass support member from view. The enclosure may be provided with ergonomic features designed to enhance the feel of a device to a user. The enclosure may be exclusively mounted to the structural glass support member or may have portions mounted to one or more internal device components. The enclosure may have a thickness that is less than the thickness of the structural glass support member. The structural glass support member may be provided with one or more mounting features on or near an edge of the structural glass support member. Mounting features may include openings in the structural glass support member, surface features on a surface of the structural glass support member, or additional mounting components attached to the structural glass support member. The enclosure may be mounted to the structural glass support member using a peripheral member. The peripheral member may include molded portions formed in openings in the structural glass support member.

Further features of the invention, its nature and various advantages will be more apparent from the accompanying drawings and the following detailed description.

DETAILED DESCRIPTION

An electronic device may be provided that has a structural glass support member.

Figure 1:
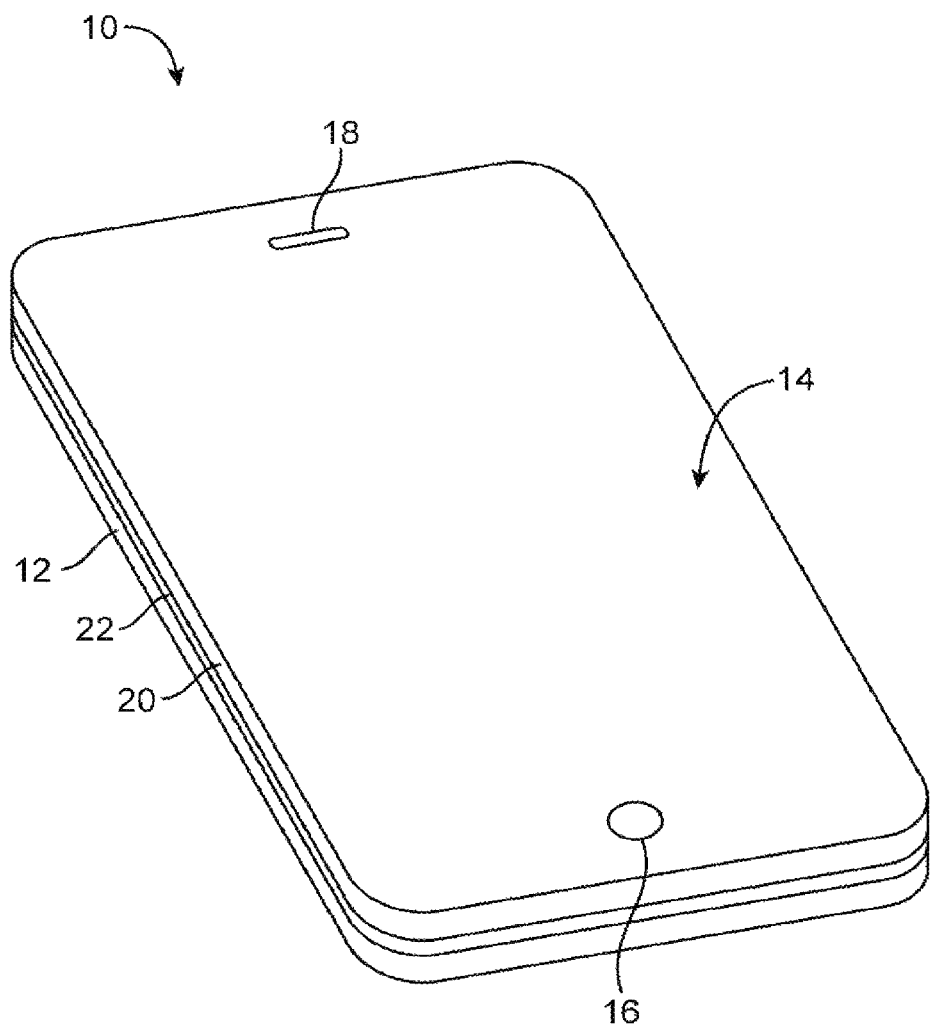
FIG. 1 is a perspective view of an illustrative electronic device with structural glass support member in accordance with an embodiment of the present invention.

An illustrative electronic device of the type that may be provided with a structural glass support member is shown in FIG. 1. Electronic device 10 may be a portable electronic device or other suitable electronic device. For example, electronic device 10 may be a laptop computer, a tablet computer, a somewhat smaller device such as a wrist-watch device, pendant device, or other wearable or miniature device, a cellular telephone, a media player, etc.

Device 10 may include a structural glass support member such as structural glass support member 20 (sometimes referred to herein as glass support member, glass member, or structural glass). Structural glass support member 20 may cover a portion, all, or substantially all of the outer surface of a display such as display 14. Structural glass support member 20 may form a planar or curved front surface for device 10. Structural glass support member 20 may form a planar or curved rear surface for device 10. Structural glass support member 20 may form one or more planar or curved sidewall surfaces for device 10. Structural glass support member 20 may be formed from a single piece of glass or may be formed from more than one separate pieces of glass. Buttons such as button 16 may pass through openings in structural glass support member 20. Openings may also be formed in the structural glass support member 20 to form a speaker port such as speaker port 18. Openings in enclosure 12 or structural glass support member 20 may be used to form input-output ports, microphone ports, speaker ports, button opening, etc.

Glass member 20 may include mounting features for mounting an enclosure such as enclosure 12 to glass member 20. Mounting features may include surface features, holes, flanges, notches, cutouts, etc. Glass member 20 may be substantially planar, may have a convex or concave shape, may form a U-channel, may form a glass tube structure into which an insert having operational components is inserted, or may have any other shape. Glass member 20 may be bent, formed, cut, slumped, etched, cast, molded, machined or otherwise shaped during manufacturing of device 10 to form sidewall structures, rear enclosures, curved front surfaces, mounting features, openings, holes, notches, cutouts or other features. Glass member 20 may be a primary structural component of device 10. Internal components, mounting members, device housings or other components of device 10 may be mounted to the primary structural member formed by glass member 20. Glass member 20 may provide resistance to bending, squeezing, twisting or other forces that may deform device 10. Glass member 20 may provide impact protection for device 10 in the event of a drop. Glass member 20 may have a thickness that allows glass member 20 to provide structural rigidity for device 10 such as a thickness from 0.6 mm to 1 mm, from 0.6 mm to 2 mm, from 0.8 mm to 1 mm, from 0.6 mm to 0.8 mm, more than 0.6 mm or less than 2 mm.

Device 10 may include a housing such as enclosure 12. Enclosure 12, (sometimes referred to as a case, thin enclosure, housing, housing structure, or thin housing), may be formed of plastic, glass, ceramics, fiber composites, metal (e.g., stainless steel, aluminum, etc.), other suitable materials, or a combination of these materials. In some situations, parts of enclosure 12 may be formed from dielectric or other low-conductivity material. In other situations, enclosure 12 or at least some of the structures that make up enclosure 12 may be formed from metal elements. Enclosure 12 may include a rear enclosure structure such as a planar glass member, plastic structures, metal structures, fiber-composite structures, or other structures. Enclosure 12 may also have sidewall structures. The sidewall structures may be formed from extended bent portions of the rear enclosure structure or may be formed from one or more separate members. Enclosure 12 may form a cosmetic covering for internal components of device 10. Enclosure 12 may provide rear impact protection for device 10 in the event of a drop of device 10. Enclosure 12 may form a fire enclosure for device 10. Enclosure 12 may include one or more ergonomic features such as curved surfaces, plastic gripping members, or other features for improving the feel of a device in, for example, the hand of a user. Some or all of enclosure 12 may be radio-transparent, (i.e., may allow radio wavelength communications to pass) while other portions of enclosure 12 may block radio communications. Enclosure 12 may be mounted to glass support member 20. Portions of enclosure 12 may be mounted to internal components of device 10. Enclosure 12 may have a thickness that is less than the thickness of glass member 20. Enclosure 12 may have a rigidity that is less resistive to bending, twisting, breaking or otherwise deforming of enclosure 12 than glass member 20 is resistive to bending, twisting, breaking or otherwise deforming of glass member 20. Mounting enclosure 12 to glass member 20 may prevent enclosure 12 from deforming under typical bending, twisting, breaking, squeezing or other deforming forces exerted on enclosure 12 during normal use of device 10.

A bezel or other peripheral member may partially or completely surround device 10 running along the interface between enclosure 12 and a structural glass support member such as structural glass support member 20. The bezel may, for example, be formed from a conductive material. With the illustrative configuration shown in FIG. 1, enclosure 12 includes a peripheral member such as peripheral member 22. Peripheral member 22 may have vertical sidewall structures, curved or angled sidewall structures, or other suitable shapes. Peripheral member 22 may be formed from stainless steel or other metals or other conductive or non-conductive materials such as plastics (e.g., polycarbonate, acrylonitrile butadiene styrene, polycarbonate acrylonitrile butadiene styrene, thermoplastic polyurethane (TPU), etc.), silicon, rubber, or other materials. In some configurations, peripheral member 22 may form a protective member that protects an edge, hole, flange or other feature of structural glass support member 20. In some configurations, peripheral member 22 may form a mounting structure for mounting enclosure 12 to structural glass support member 20.

Device 10 may have a flexible or rigid display such as display 14. Display structures such as liquid crystal display components, organic light emitting diodes, indium tin oxide electrodes, color filters, polarizers, or other display structures may be covered by glass member 20. Display 14 may be formed from multiple layers of material. These layers may include a touch sensor layer such as a layer on which a pattern of indium tin oxide (ITO) electrodes or other suitable transparent electrodes have been deposited to form a capacitive touch sensor array. These layers may also include a layer that contains an array of display pixels. The touch sensor layer and the display layer may be formed using flexible sheets of polymer or other substrates having thicknesses of 10 microns to 0.5 mm or other suitable thicknesses (as an example). Display 14 may be mounted to glass member 20 of device 10 using adhesives such as Pressure Sensitive Adhesive (PSA), foam-PSA laminate, liquid adhesive, or using discrete bonding members such as screws, snaps, fasteners, rivets or other mounting structures or adhesives. Layers of display 14 may be bonded to other layers of display 14 using transparent or opaque adhesives. Transparent or opaque adhesives used to bond touch-layers, display-layers and other layers of display 14 to each other may be formed so that adhesive bonds between layers are strong enough to withstand pulling, twisting, bending or other forces that may be exerted on display 14 by device members such as glass member 20 or internal components mounted on a side of display 14 opposing a side of display 14 that is mounted to glass member 20.

The display pixel array may be, for example, an organic light-emitting diode (OLED) array. Other types of flexible or rigid display pixel arrays may also be formed (e.g., electronic ink displays, LCD displays, etc.). The use of OLED technology to form display 14 is sometimes described herein as an example. This is, however, merely illustrative. Display 14 may be formed using any suitable display technology that is able to withstand forces associated with mounting glass structures and components to opposing sides of the display. The use of flexible displays that are based on OLED technology is merely illustrative.

Device 10 may be provided with internal components such as logic boards, printed circuit boards, integrated circuits, memory and storage, batteries, input-output components, etc. Internal components may be mounted to other internal components, may be mounted to display 14, or may be mounted to glass member 20. Enclosure 12 may form a housing that surrounds internal components of device 10. Enclosure 12 may be mounted exclusively or in part to internal components of device 10.

Figure 2:
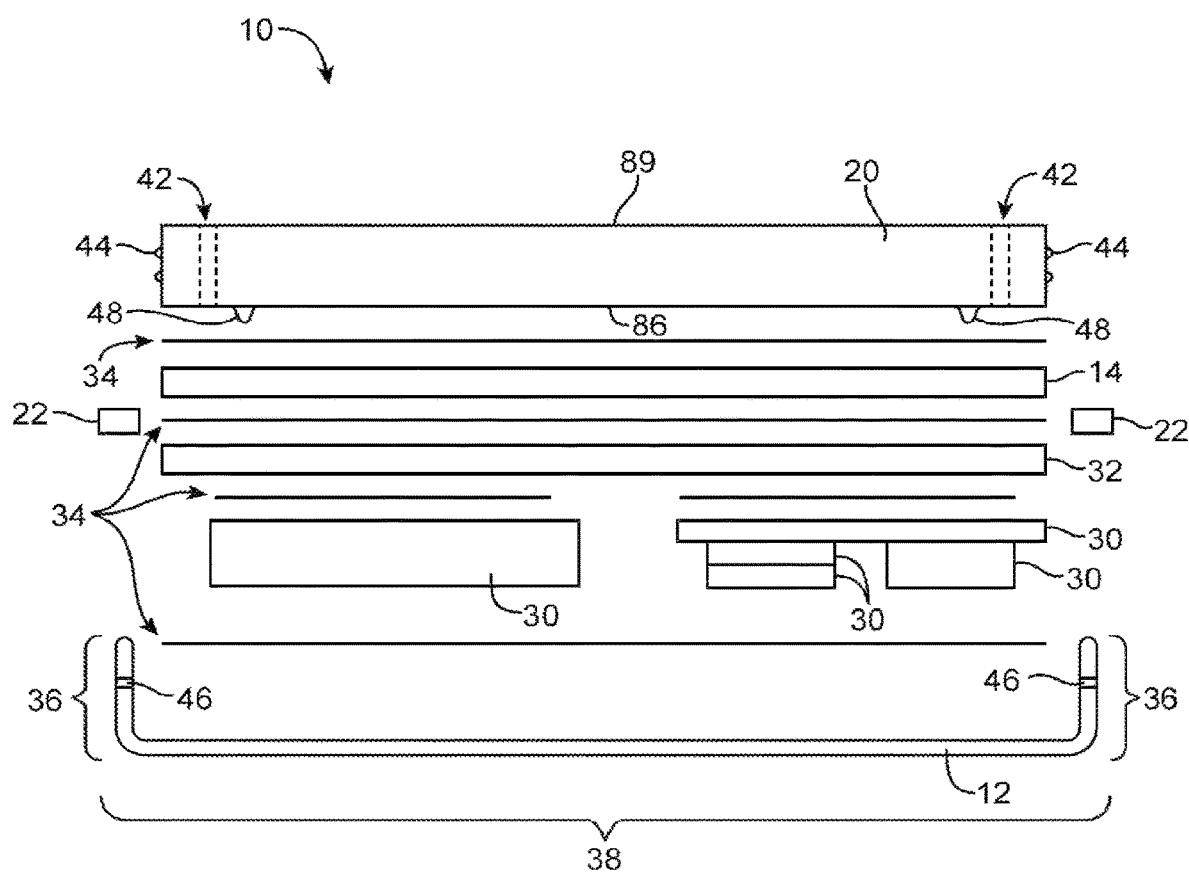
FIG. 2 is an exploded side view of an illustrative electronic device having a planar structural glass support member in accordance with an embodiment of the present invention.

An exploded cross-sectional side view of an illustrative device 10 having a structural glass support member and internal components is shown in FIG. 2. In the example of FIG. 2, glass member 20 is substantially planar. Glass member 20 may be provided with mounting features for mounting an enclosure such as enclosure 12 to glass member 20. Mounting features may include one or more holes 42 in glass member 20, protrusions from a peripheral edge such as surface features 44, ridges such as flanges 48 or other mounting features.

As shown in FIG. 2, device 10 may be provided with adhesive layers 34 for mounting device components to structural glass support member 20. Device components such as display 14 may be attached to structural glass support member 20 using adhesive 34. Adhesive 34 may be a Pressure Sensitive Adhesive (PSA), a foam-PSA laminate, a liquid adhesive, or other adhesive. Adhesive 34 may be a transparent (e.g., optically transmissive) or opaque adhesive. Device 10 may be provided with operational (electrical) components such as internal components 30. Internal components 30 may include logic boards, printed circuit boards, rigid or flexible circuitry, integrated circuits, memory and storage, batteries, input-output components such as speakers, actuators, etc. or other components. Internal components 30 may be constructed so that internal components 30 are able to withstand loads (e.g., pressures, forces, heat loads, etc.) associated with other components 30, display 14, enclosure 12 or other device components that are attached to internal components 30. For example, internal components 30 may include a battery cell or laminated package of battery cells laminated into a single structured battery pack so that, the battery is able to support other internal components 30, display 14, enclosure 12 or other device components that may be attached to the battery. Device 10 may be provided with a heat conducting member such as mid-plate 32. Mid-plate 32 may be interposed between display 14 and other internal components 30. Conductive mid-plate 30 may help prevent heat from accumulating in a particular portion of device 10. Conductive mid-plate 30 may help conduct heat away from display 14 or components 30. Mid-plate 30 may be mounted to display 14 using one of adhesive layers 34. Other components may be mounted to mid-plate 30 using one of adhesive layers 34. This is merely illustrative. Device 10 may be provided without a heat conducting mid-plate such as mid-plate 32, if desired.

As shown in FIG. 2, enclosure 12 may have a rear portion 38 that forms a rear surface for device 10. Enclosure 12 may have bent portions 36 that form sidewall surfaces for device 10. Bent portions 36 and rear portion 38 of enclosure 12 may be formed from a single structure or may be formed from multiple joined structures. Enclosure 12 may be formed from plastic, glass, ceramics, fiber composites, metal (e.g., stainless steel, aluminum, etc.), other suitable materials, or a combination of these materials.

Enclosure 12 may be attached to internal components 30 using one of adhesive layers 34. If desired, device 10 may be provided with peripheral members 22. Peripheral members 22 may be molded peripheral members that are molded to have a particular shape. Molded peripheral members may be molded into engagement with mounting features on glass member 20. Peripheral members 22 may be formed from stainless steel or other metals or other conductive or non-conductive materials such as plastic, silicon, rubber, thermoplastic polyurethane, or other materials. In some configurations, peripheral member 22 may form a protective member that protects a peripheral edge, a hole, a flange or any other feature of structural glass support member 20. Portions of peripheral members 22 may be formed on edges, in holes 42, around flanges 48, over surface features 44 or on other portions of glass member 20. Peripheral members 22 may help protect portions of glass member 20 that are particularly vulnerable to damage due to impacts, twisting, squeezing or other forces on glass member 20 during normal use of device 10. In some configurations, peripheral member 22 may form a mounting structure for mounting enclosure 12 to structural glass support member 20. Peripheral member 22 may be mounted to glass member 20 using holes 42, flanges 48, surface features 44 or other mounting features associated with glass member 20. Enclosure 12 may be mounted to glass member 20 using peripheral members 22 and, if desired, mounting features such as holes 46 on enclosure 12. Holes 46 may be formed on bent portions 36 of enclosure 12 or may be formed on other portions such as rear portion 38 of enclosure 12. In some configurations, enclosure 12 may be formed without bent portions 36. In configurations in which enclosure 12 is formed without bent portions 36, holes 46 may be formed in rear portion 38 of enclosure 12. The example of FIG. 2 in which glass member 20 is substantially planar is merely illustrative. Glass member 20 may have other shapes. Glass member 20 may have an interior surface 86 interior to device 10 and an exterior surface 89 that forms at least a portion of an exterior surface of device 10.

Figure 3:
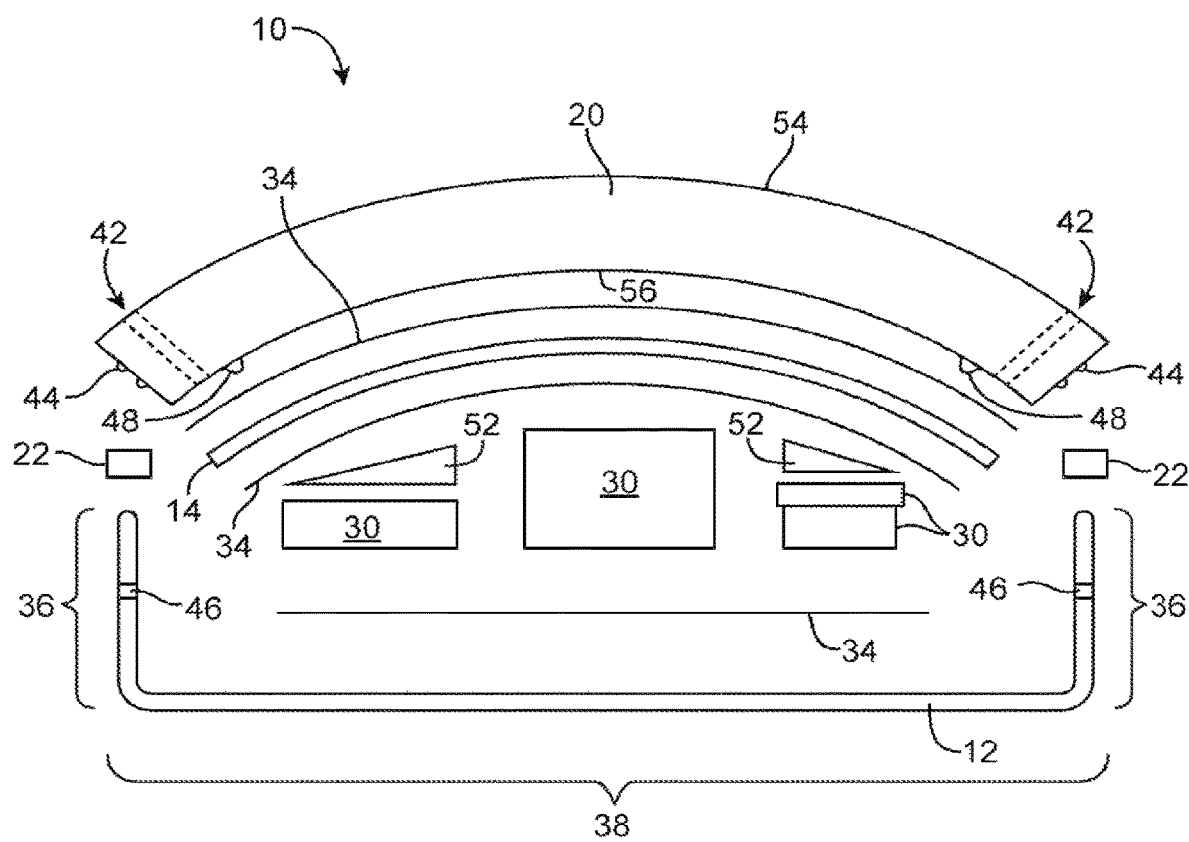
FIG. 3 is an exploded cross-sectional side view of an illustrative electronic device having a convex structural glass support member in accordance with an embodiment of the present invention.

A cross-sectional side view showing how glass member 20 of device 10 may have a convex outer surface is shown in FIG. 3. As shown in FIG. 3, structural glass support member 20 may have a convex exterior (outer) surface 54 and an opposing concave interior (inner) surface 56. In configurations in which glass member 20 has a concave inner surface, display 14 may be a flexible display that is attached to concave inner surface 56 of glass member 20 using adhesive layer 34. In configurations in which display 14 is attached to concave inner surface 56 so that display 14 conforms to the concave shape of concave inner surface 56, device 10 may be provided with spacing members such as spacers 52 that allow internal components 30 having planar surfaces to attach to a curved flexible display 14. Spacers 52 may be attached to display 14 using one of adhesive layers 34. Internal components 30 may be attached to spacers 52 using one of adhesive layers 34. Enclosure 12 may be attached to glass member 20 using peripheral members and mounting features such as holes 46. Enclosure 12 may be attached to glass member using adhesive attachments to internal components 30 interposed between enclosure 12 and glass member 20 using one or more of adhesive layers 34. Glass member 20 may have a concave interior surface such as surface 56 and may be provided with mounting features such as holes 42, flanges 48, surface features 44 or other mounting features. Mounting features may be formed on interior surface 56, exterior surface 54, a peripheral edge of glass member 20, may be formed partially inside and partially outside, wholly inside, or wholly outside, of glass member 20.

Figure 4:
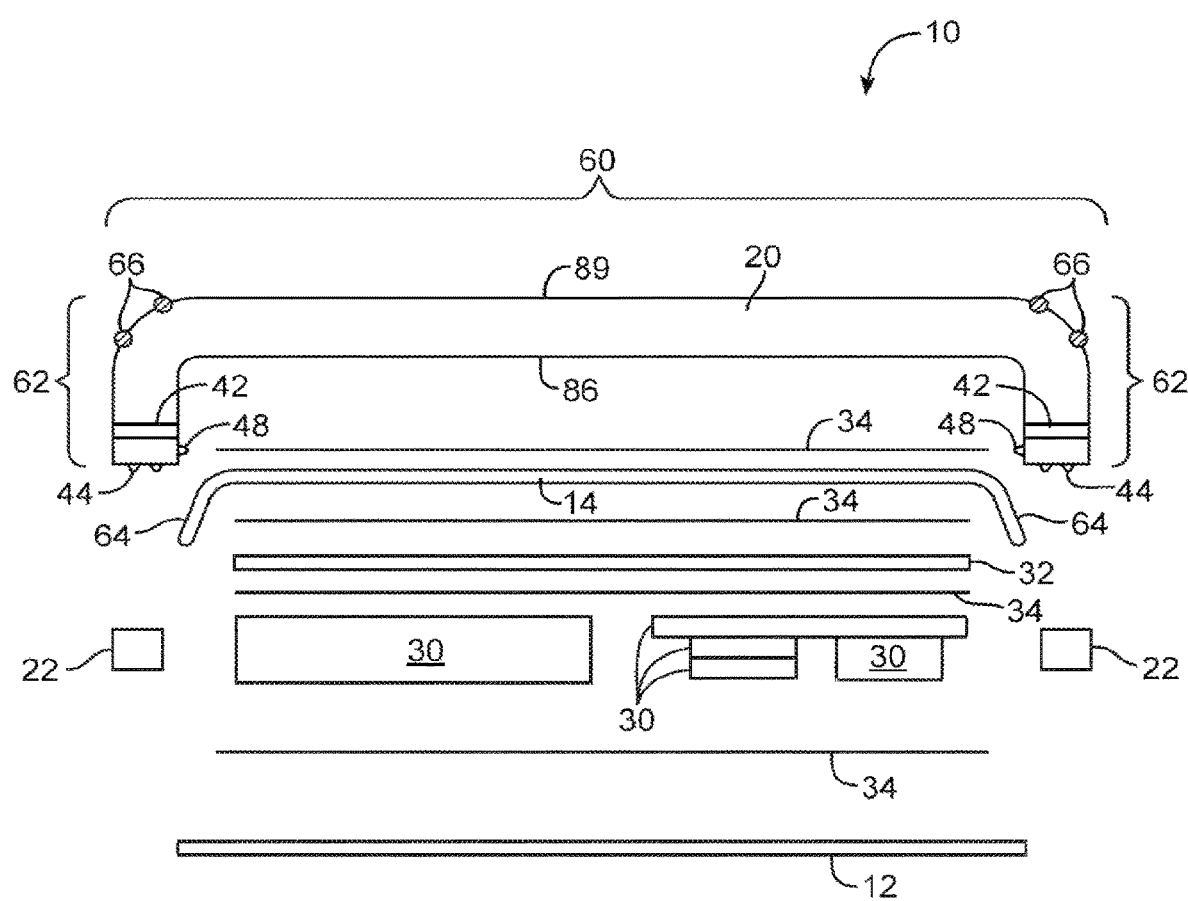
FIG. 4 is an exploded cross-sectional side view of an illustrative electronic device having a structural glass support member with bent portions that form sidewall structures in accordance with an embodiment of the present invention.

A cross-sectional side view showing how glass member 20 of device 10 may have a planar front surface 60 and bent sidewall surfaces 62 forming a U-channel is shown in FIG. 4. Glass member 20 may have an interior surface 86 interior to device 10 and an exterior surface 89 that forms at least a portion of an exterior surface of device 10. As shown in FIG. 4, in configurations in which glass member 20 has a planar front surface 60 and bent sidewall surfaces 62, display 14 may be a flexible display having bent portions 64 that conform to sidewall surfaces 62 of glass member 20. Sidewall portions 62 of glass member 20 may be provided with mounting features such as holes 42, flanges 48, surface features 44 or other mounting features. In order to provide additional protection against damage due to an impact of an external object to glass member 20, glass member 20 may be provided with one or more bumper members such as bumpers 66. Bumpers 66 may be formed from plastic, silicon, rubber, thermoplastic polyurethane, or other materials. Bumpers 66 may be formed in notches or cutouts on an external surface of glass member 20.

Figure 5:
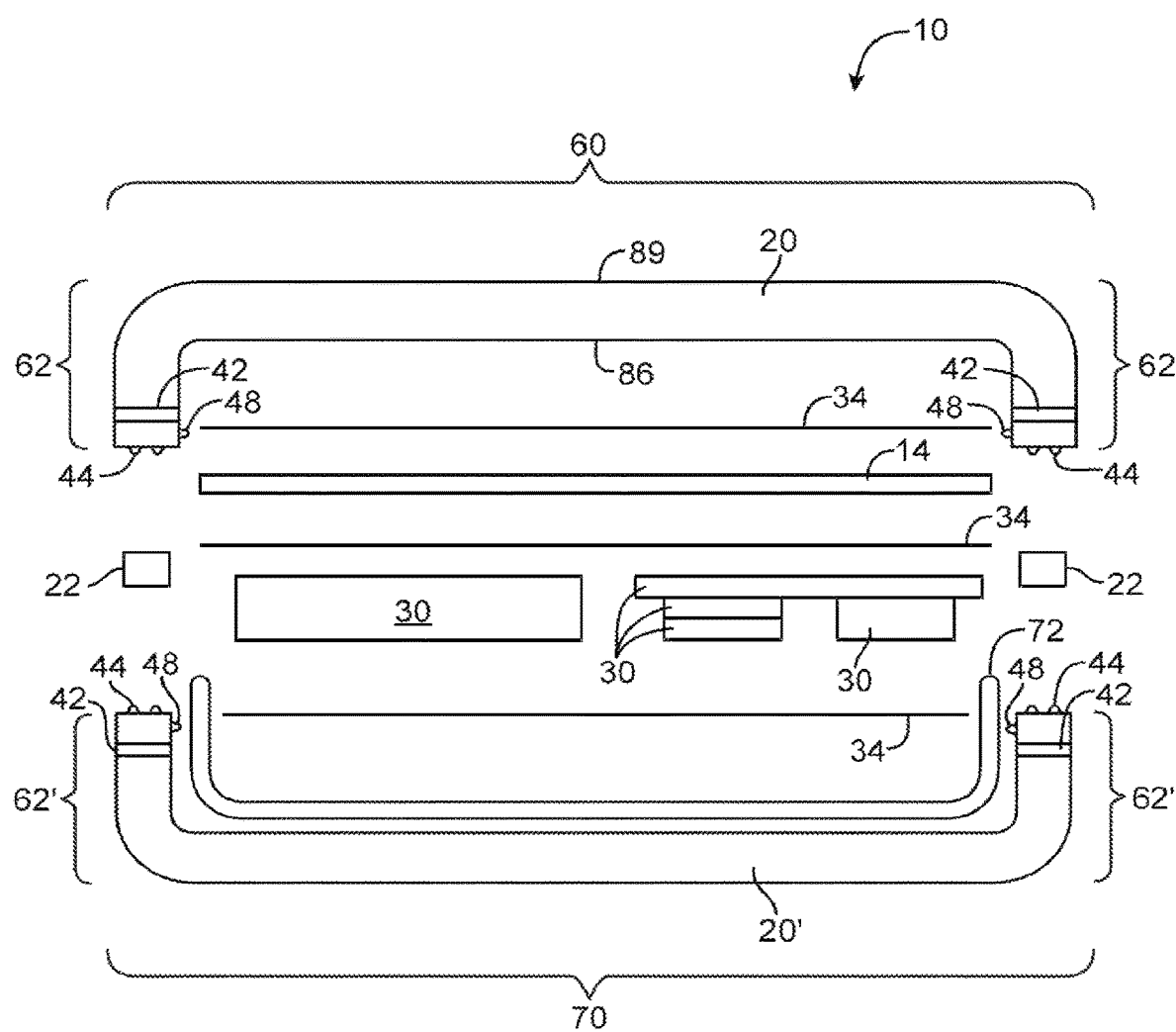
FIG. 5 is an exploded cross-sectional side view of an illustrative electronic device having multiple structural glass support members with bent portions that form sidewall structures in accordance with an embodiment of the present invention.

A cross-sectional side view showing how device 10 may be provided with glass member 20 that forms a front surface 60 and sidewall surfaces 62 may be combined with a second structural glass support member 62' forming a rear surface 70 and sidewall portions 62' is shown in FIG. 5. Glass member 20 may have an interior surface 86 interior to device 10 and an exterior surface 89 that forms at least a portion of an exterior surface of device 10. As shown in FIG. 5, sidewall portions 62 of glass member 20 and sidewall portions 62' of glass member 20' may form, a sidewall for device 10. Second structural glass support member 20' may be attached to structural glass support member 20 using peripheral members 22. Glass member 20 and glass member 20' may be provided with mounting features such as holes 42, surface features 44, flanges 48 or other mounting features for attaching peripheral members 22 to glass members 20 and 20'. In configurations in which rear surface 70 and portions of device sidewall surfaces such as sidewall surfaces 62' are formed from transparent glass, device 10 may be provided with an opaque mashing layer such as opaque masking layer 72. Opaque masking layer 72 may be formed on an inner surface of glass member 20'. Opaque masking layer 72 may be formed from black ink, black plastic film, silver ink, silver plastic film or opaque masking material of another color. The example of FIG. 5 in which multiple glass members (i.e., glass members 20 and 20') form front, rear and sidewall surfaces for device 10 is merely illustrative.

Figure 6:
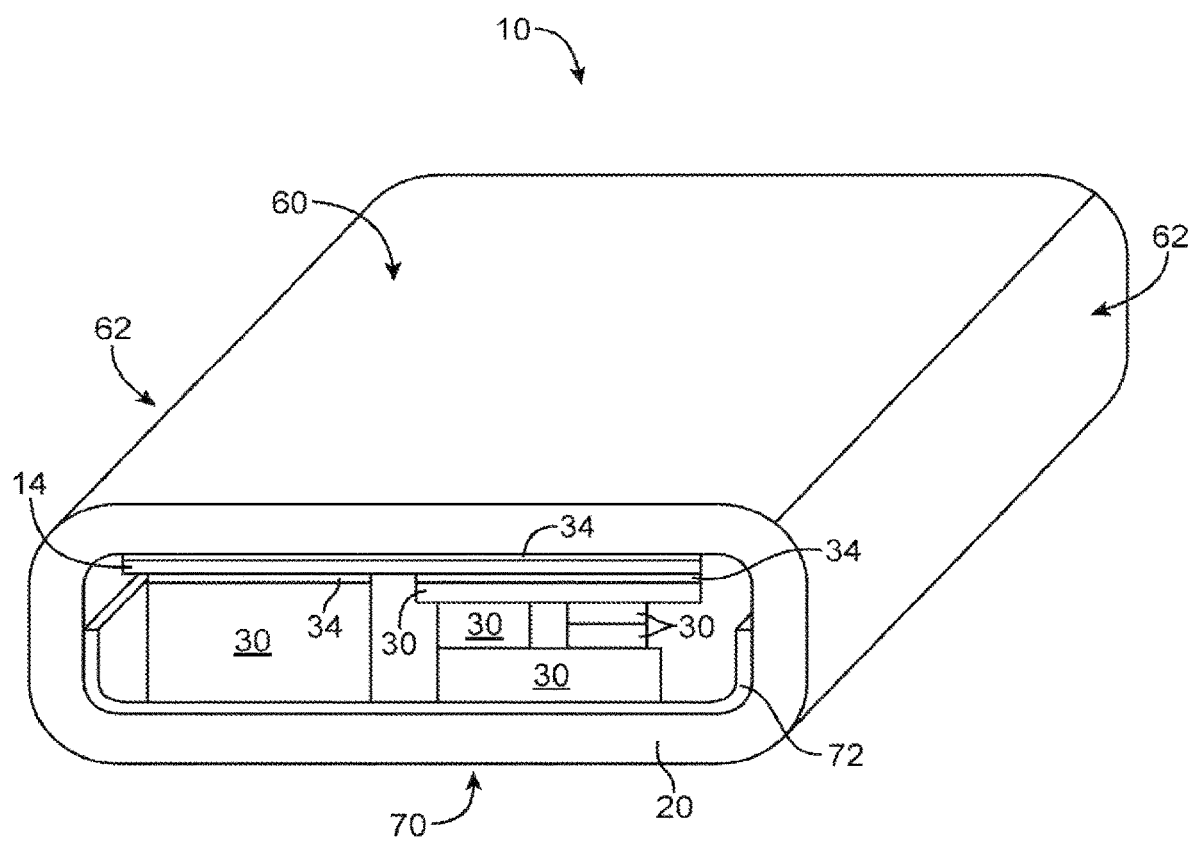
FIG. 6 is a perspective view of an illustrative electronic device having a tubular structural glass support member with and a component insert in accordance with an embodiment of the present invention.

If desired, glass front, rear, and sidewall surfaces may be formed from a hollow glass member as shown in FIG. 6. In the example of FIG. 6, structural glass support member 20 forms front surface 60, rear surface 70 and sidewall surfaces 62 for device 10. In this example, structural glass support member is a single, hollow, tubular glass structure. In configurations in which glass member 20 is a single tubular glass structure, display 14 may be attached to internal components 30 prior to insertion into the interior of glass member 20. Display 14 and internal components 30 may be inserted as a single unit into glass member 20 during assembly of device 10. In configurations in which rear surface 70 and portions of device sidewall surfaces 62 are formed from transparent glass, device 10 may be provided with an opaque masking layer such as opaque masking layer 72.

Figure 7:
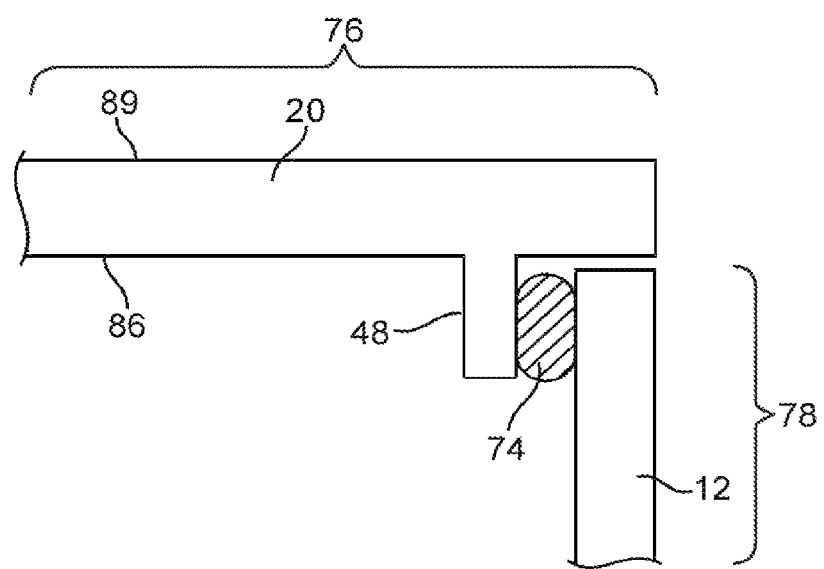
FIG. 7 is a cross-sectional side view of a portion of an illustrative electronic device in the vicinity of an interface between an enclosure and a structural glass support member in accordance with an embodiment of the present invention.

FIGS. 7, 8, 9, 10, and 11 show illustrative embodiments of mounting structures associated with structural glass support member 20 for attaching enclosure 12 to glass member 20. As shown in FIG. 7, glass member 20 may be provided with one or more protrusions from interior surface 86 of glass member such as flanges 48. Portion 78 of enclosure 12 may be attached to structural glass support member 20 by attaching portion 78 to flange 48 using an adhesive such as adhesive 74. Adhesive 74 may be a PSA, a foam-PSA laminate, a liquid adhesive, or other adhesive. Portion 76 of glass member 20 of FIG. 7 may be a portion of top surface 60 or may be a portion of sidewall surface 62 of glass member 20. In configurations in which portion 76 is a portion of top surface 60 of device 10, portion 78 of enclosure 12 may be portion of bent portion 36 of enclosure 12 (see, e.g., FIG. 2). In configurations in which portion 76 is a portion of sidewall surface 62 of device 10, portion 78 of enclosure 12 may be portion of rear portion 38 of enclosure 12 (see, e.g., FIG. 2). If desired, portion 78 may be attached to flange 48 using other attaching mechanisms such as fasteners, screws, welds, clips, etc.

Figure 8:
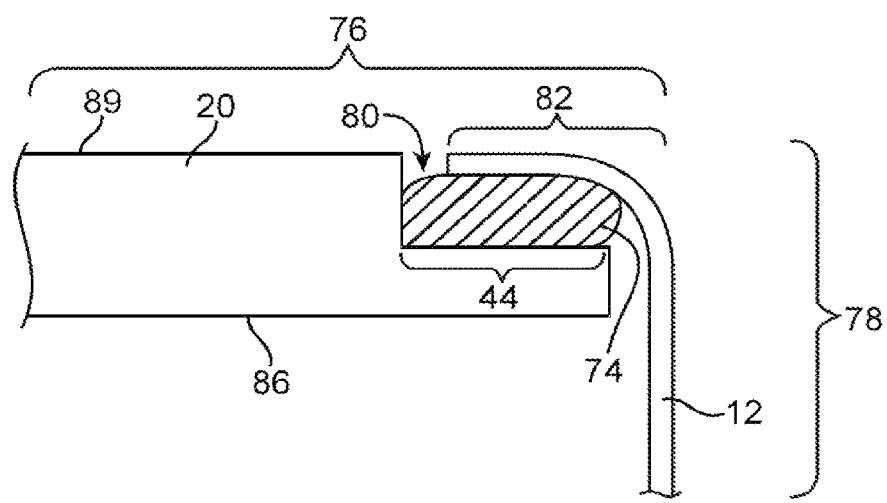
FIG. 8 is a cross-sectional side view of a portion of an illustrative electronic device in the vicinity of an interface between an enclosure and a structural glass support member with a notch in accordance with an embodiment of the present invention.

As shown in FIG. 8, mounting features of structural glass support member 20 may include a notch such as notch 80. Notch 80 may be cut, etched, cast, molded, machined, or otherwise formed on glass member 20. Portion 82 of thin enclosure 12 may be mounted to notch of glass member 20 using adhesive 74 or any other attaching mechanism. Glass member 20 may have an interior surface 86 interior to device 10 and an exterior surface 89 that forms at least a portion of an exterior surface of device 10. Portion 76 of glass member 20 of FIG. 8 may be a portion of top surface 60 or may be a portion of sidewall surface 62 of glass member 20. In configurations in which portion 76 is a portion of top surface 60 of device 10, portion 78 of enclosure 12 may be portion of bent portion 36 of enclosure 12 (see, e.g., FIG. 2) and portion 82 may form a further bent portion of enclosure 12. In configurations in which portion 76 is a portion of sidewall surface 62 of device 10, portion 78 of enclosure 12 may be portion of rear portion 38 of enclosure 12 (see, e.g., FIG. 2) and portion 82 may be a portion of bent portion 36 of enclosure 12.

Figure 9:
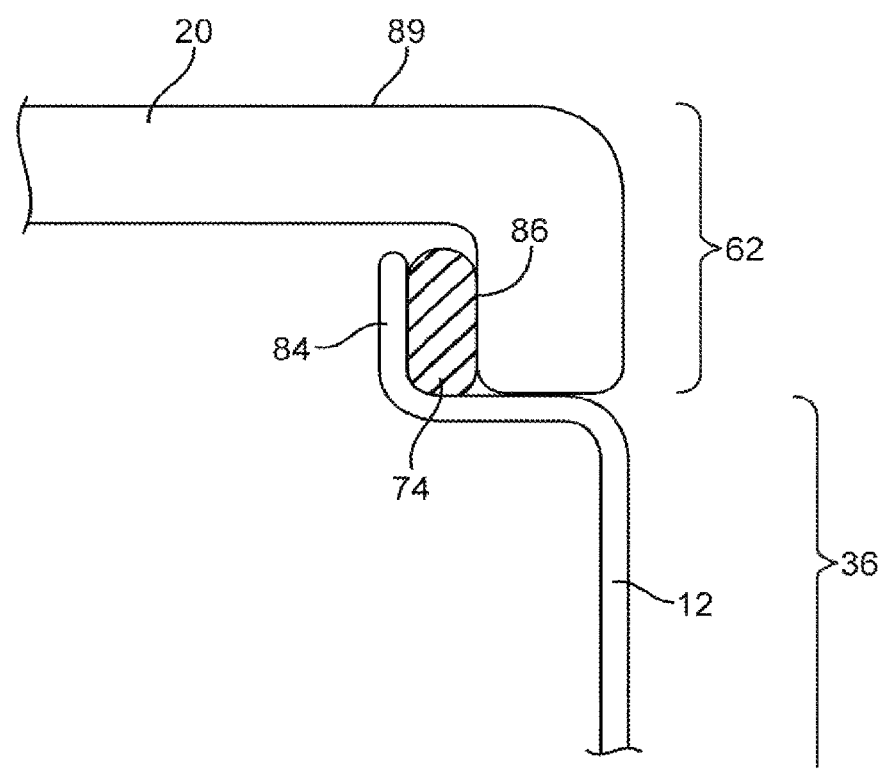
FIG. 9 is a cross-sectional side view of a portion of an illustrative electronic device in the vicinity of an interface between an enclosure and a structural glass support member with a bent portion that forms a sidewall in accordance with an embodiment of the present invention.

As shown in FIG. 9, enclosure 12 may include a curved portion 84 for attaching enclosure 12 to bent sidewall portion 62 of structural glass support member 20 of device 10. Curved portion 84 may be provided for attaching bent portion 36 of enclosure 12 to interior surface 86 of glass member 12. Curved portion 84 may be attached to interior surface 86 using adhesive 74 or any other attaching mechanism.

Figure 10:
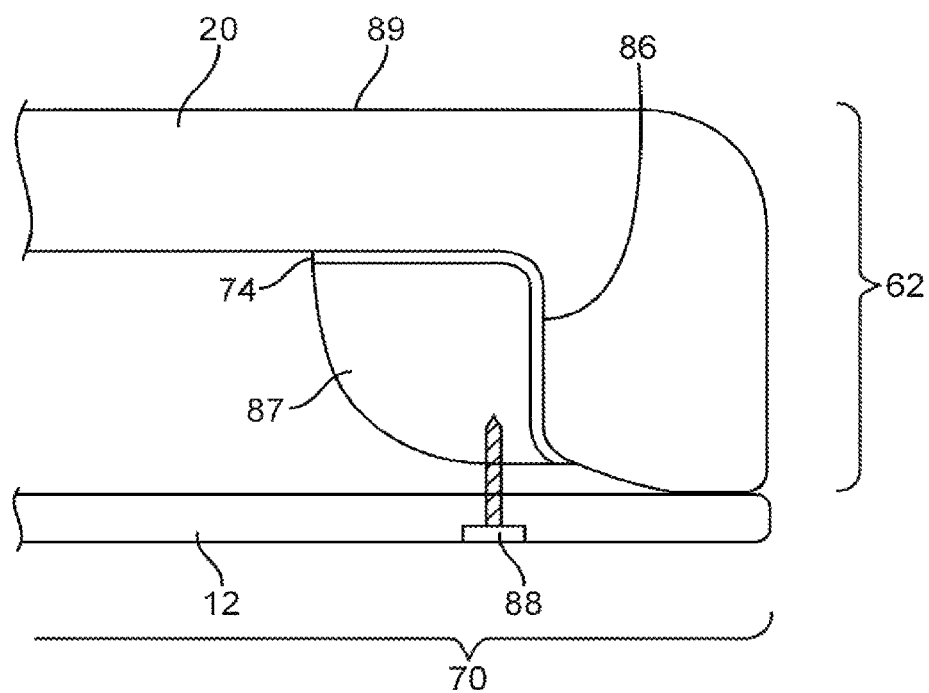
FIG. 10 is a cross-sectional side view of a portion of an illustrative electronic device in the vicinity of a fastener at an interface between an enclosure and a structural glass support member with a bent portion that forms a sidewall in accordance with an embodiment of the present invention.

As shown in FIG. 10, device 10 may be provided with attachment members such as attachment member 87. Attachment member 87 may be attached to interior surface 86 of glass member 20. Attachment member may be attached to interior surface 86 of bent sidewall portion 62 of glass member 20 using an adhesive such as adhesive 74. Housing 12 may be attached to glass member 20 using a fastener such as fastener 88. Fastener 88 may pass through enclosure 12 and into attachment member 87. Fastener 88 may be a screw or other fastener, clip, protrusion or other engagement feature for engaging attachment member 88. Attachment member 87 may be mounted adjacent to sidewall portion 62 of glass member 20 so that sidewall portion 62 forms a sidewall for device 10 and enclosure 12 forms rear surface 70 of device 10.

Figure 11:
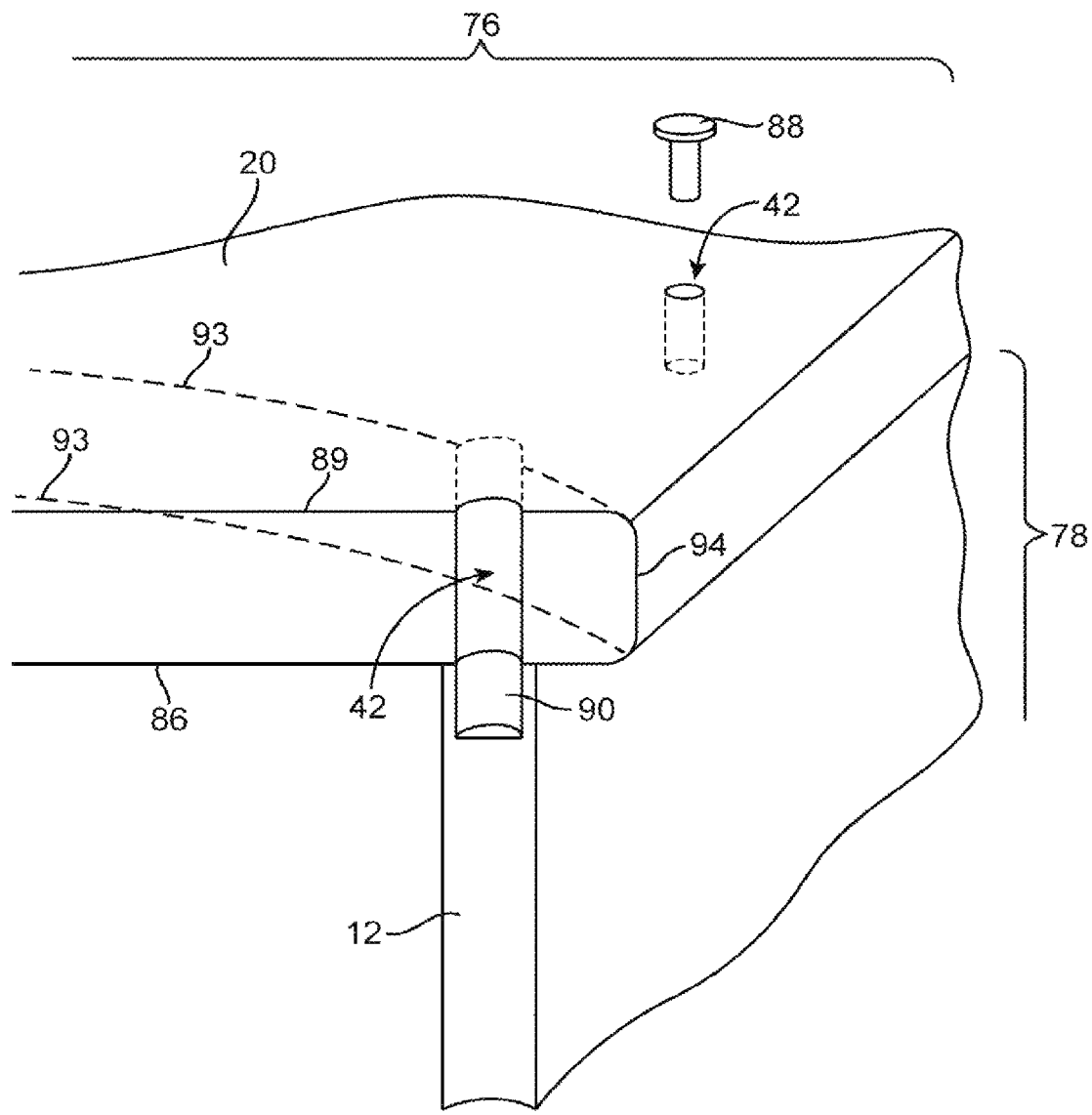
FIG. 11 is a cross-sectional side view of a portion of an illustrative electronic device in the vicinity of an interface between an enclosure and a structural glass support member that has mounting holes in accordance with an embodiment of the present invention.

As shown in FIG. 11, mounting features of structural glass support member 20 may include openings such as holes 42 in glass member 20. Holes 42 in glass member 20 may be aligned with corresponding holes 90 in enclosure 12. Openings such as holes 42 may extend from exterior surface 89 to interior surface 86 of glass member 20. Holes 42 in glass member 20 and holes 90 in enclosure 12 may be used to attach portion 78 of enclosure 12 to portion 76 of glass member 20 using screws or other fasteners (e.g., by inserting fasteners such as fasteners 88 through holes 42 into holes 90), or using peripheral members 22 (see, e.g., FIG. 2) by filling holes 42 and holes 90 with molded plastic or other material. In the example of FIG. 11, holes 42 and holes 90 are substantially linear holes. This is merely illustrative. Holes 42 and holes 90 may include bends or curves that provide openings in multiple surfaces of glass member 20 and enclosure 12, respectively (e.g. holes 42 may extend from interior surface 86 to peripheral edge 94 of glass member 20, if desired). Portion 76 of glass member 20 of FIG. 11 may be a portion of top surface 60 or may be a portion of sidewall surface 62 of glass member 20. In configurations in which portion 76 is a portion of top surface 60 of device 10, portion 78 of enclosure 12 may be portion of bent portion 36 of enclosure 12 (see, e.g., FIG. 2). In configurations in which portion 76 is a portion of sidewall surface 62 of device 10, portion 78 of enclosure 12 may be portion of rear portion 38 of enclosure 12 (see, e.g., FIG. 2). In the example of FIG. 11, glass member 20 may be substantially planar or may be curved as indicated by dashed lines 93.

Providing electronic devices such as device 10 with structural glass support members with mounting features may produce portions of the glass (e.g., edges, holes, protrusions, flanges) that are relatively more vulnerable to failure or fracture due to pressures, impacts or other events during normal usage of device 10. For this reason, portions of glass member 20 may be provided with protective members for protecting those portions from failure. Protective members may be formed from a portion of peripheral member 22 (see, e.g., FIG. 2) or may be separate protective members.

Figure 12:
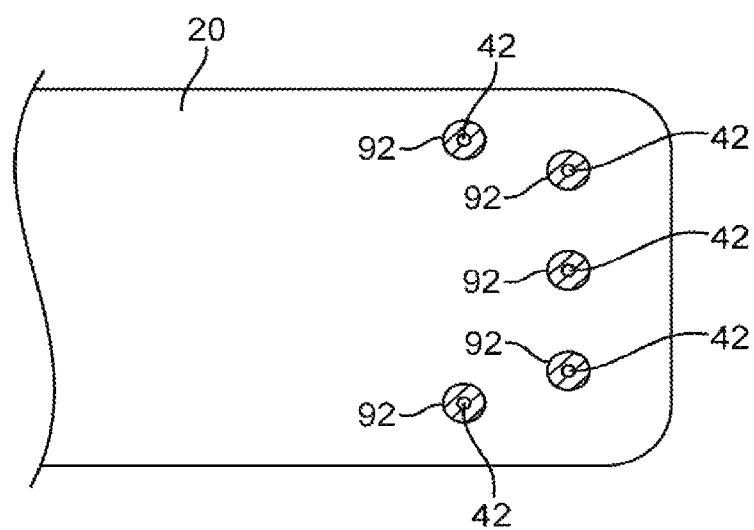
FIG. 12 a top view of a portion of an illustrative structural glass support member that has mounting holes with protective members in accordance with an embodiment of the present invention.
Figure 13:
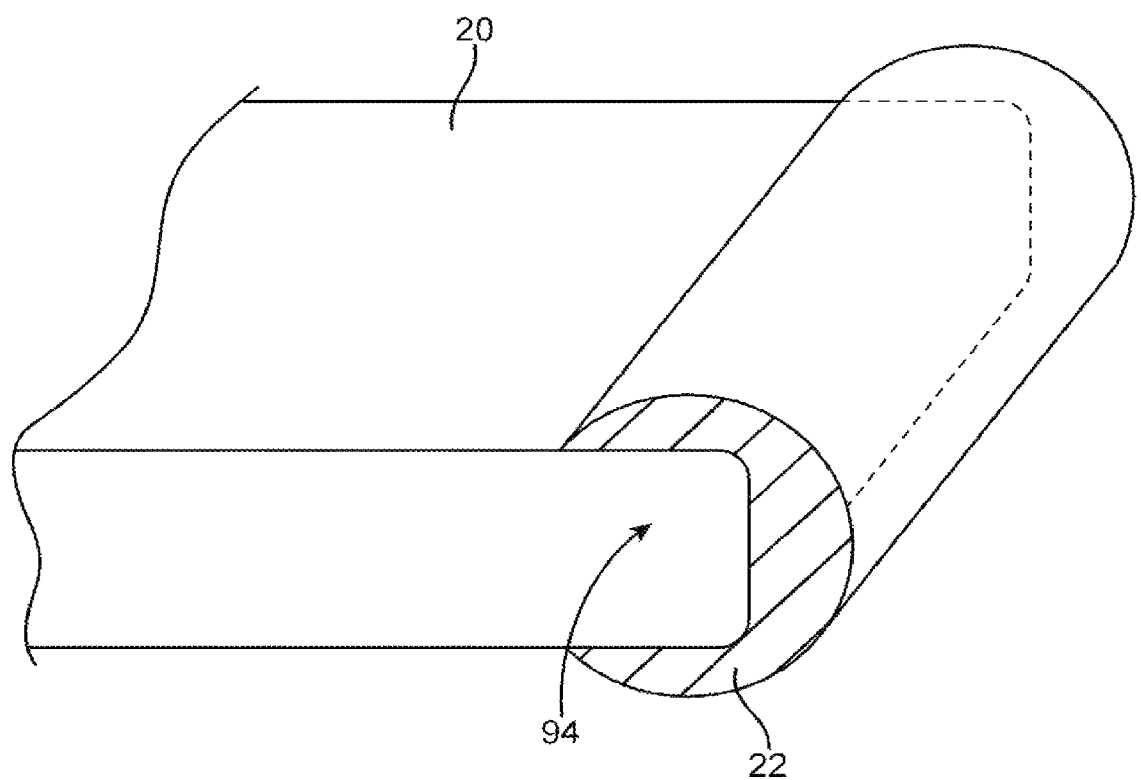
FIG. 13 is a perspective view of a portion of an illustrative structural glass support member that has a protective member on an edge of the structural glass support member in accordance with an embodiment of the present invention.

FIGS. 12, 13, 14, 15, 16, 17, and 18 show embodiments of protective members attached to portions of structural glass support member 20. FIG. 12 is a top view of structural glass member 20 with holes 42 around at least a portion of the periphery of glass member 20. Holes 42 in glass member 20 may be used for attaching enclosure 12 to glass member 20. Holes 42 may be formed around a portion of the periphery of glass member 20 or may be formed around substantially all of the periphery of glass member 20. As shown in FIG. 12, holes 42 may be partially filled with protective members 92. Protective member 92 may be formed from metal, plastic, TPU, silicon, rubber, composite materials or other materials.

As shown in FIGS. 13, 14, 15, 16, 17, and 18, protective members may be formed from a portion of a peripheral member such as peripheral member 22 (see, e.g., FIG. 2). Peripheral member 22 may include a portion that covers a peripheral edge such as edge 94 of structural glass support member 20.

Figure 14:
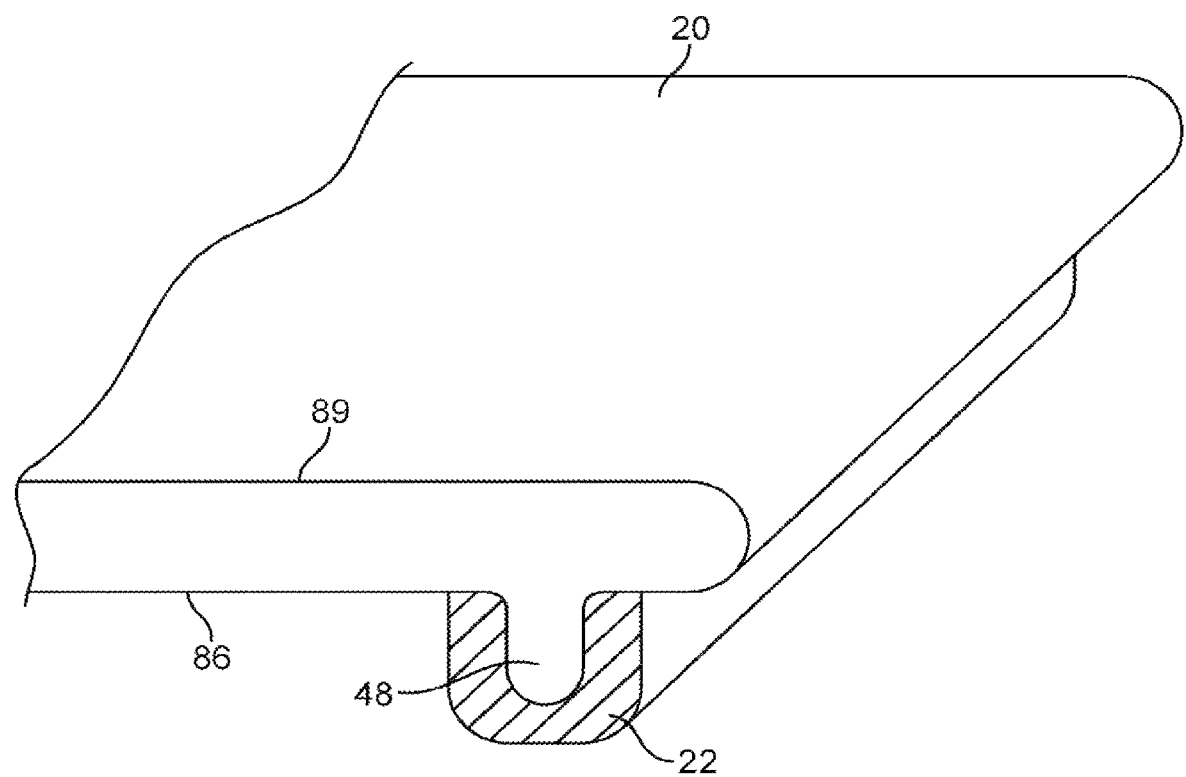
FIG. 14 is a perspective view of a portion of an illustrative structural glass support member that has a protective member on a flange of the structural glass support member in accordance with an embodiment of the present invention.

As shown in FIG. 14, peripheral member 22 may include portion that covers a mounting feature such as flange 48 of structural glass support member 20.

Figure 15:
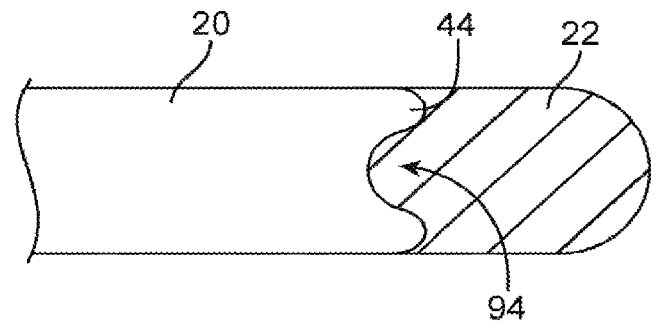
FIG. 15 is a cross-sectional side view of a portion of an illustrative structural glass support member that has surface features on peripheral edge of the structural glass support member for mounting a protective member in accordance with an embodiment of the present invention.
Figure 16:
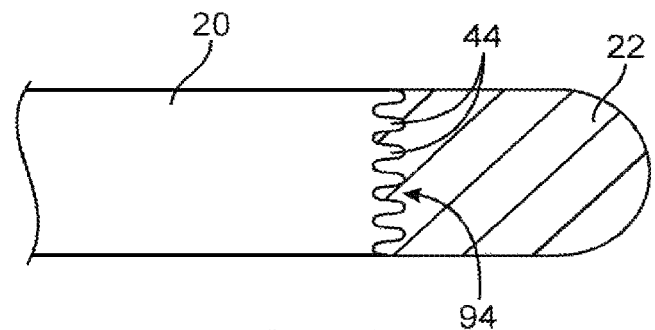
FIG. 16 is a cross-sectional side view of a portion of an illustrative structural glass support member that has surface features on a peripheral edge of the structural glass support member for mounting a protective member in accordance with an embodiment of the present invention.
Figure 17:
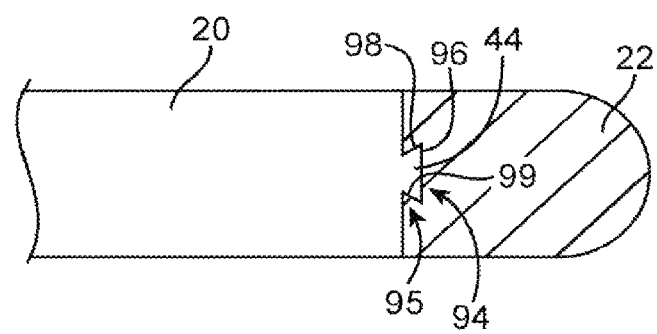
FIG. 17 is a cross-sectional side view of a portion of an illustrative structural glass support member that has surface features on peripheral edge of the structural glass support member for mounting a protective member in accordance with an embodiment of the present invention.

As shown in FIGS. 15, 16, and 17, edge 94 of structural glass support member 20 may be provided with mounting features (sometimes referred to herein as engagement features) such as surface features 44. Surface features 44 may help attach a protective member such as peripheral member 22 to edge 94 of glass member 20. Surface features 44 may be cut, etched, cast, molded, machined, or otherwise formed on edge 94 of glass member 20. Peripheral members 22 may be attached to edge 94 of glass member 20 using adhesive, molding, or other attachment mechanisms. As an example, peripheral members 22 may be molded into engagement with surface features 44 of edge 94. As shown in FIG. 15, surface features 44 may be smooth curves on edge 94 of glass member 20. Smooth curve surface features may increase the surface area of edge 94 for attaching peripheral member 22 to glass member 20.

As shown in FIG. 16, surface features 44 may include surface roughness on edge 94 of glass member 20 that helps attach an edge protecting member such as peripheral member 22 to edge 94 of glass member 20.

As shown in FIG. 17 surface features 44 may include patterned structural attachment features that provide multiple surfaces such as surfaces 96, 98 and 99 that help attach an edge protecting member such as peripheral member 22 to edge 94 of glass member 20. Some surfaces such as surfaces 98 and 99 may be configured to form an acute angle such as angle 95 with peripheral edge 94 of glass member 20. Angle 95 may be less than 90 degrees, less than 80 degrees, less than 70 degrees, less than 60 degrees, less than 50 degrees, less than 30 degrees, less than 20 degrees, less than 10 degrees or less than 5 degrees. Providing mounting features such as surface features 44 having multiple surfaces including surfaces that form acute angles with peripheral edge 94 of glass member 20 may help lock a molded protective member such as protective member 22 onto peripheral edge 94 of glass member 20.

Figure 18:
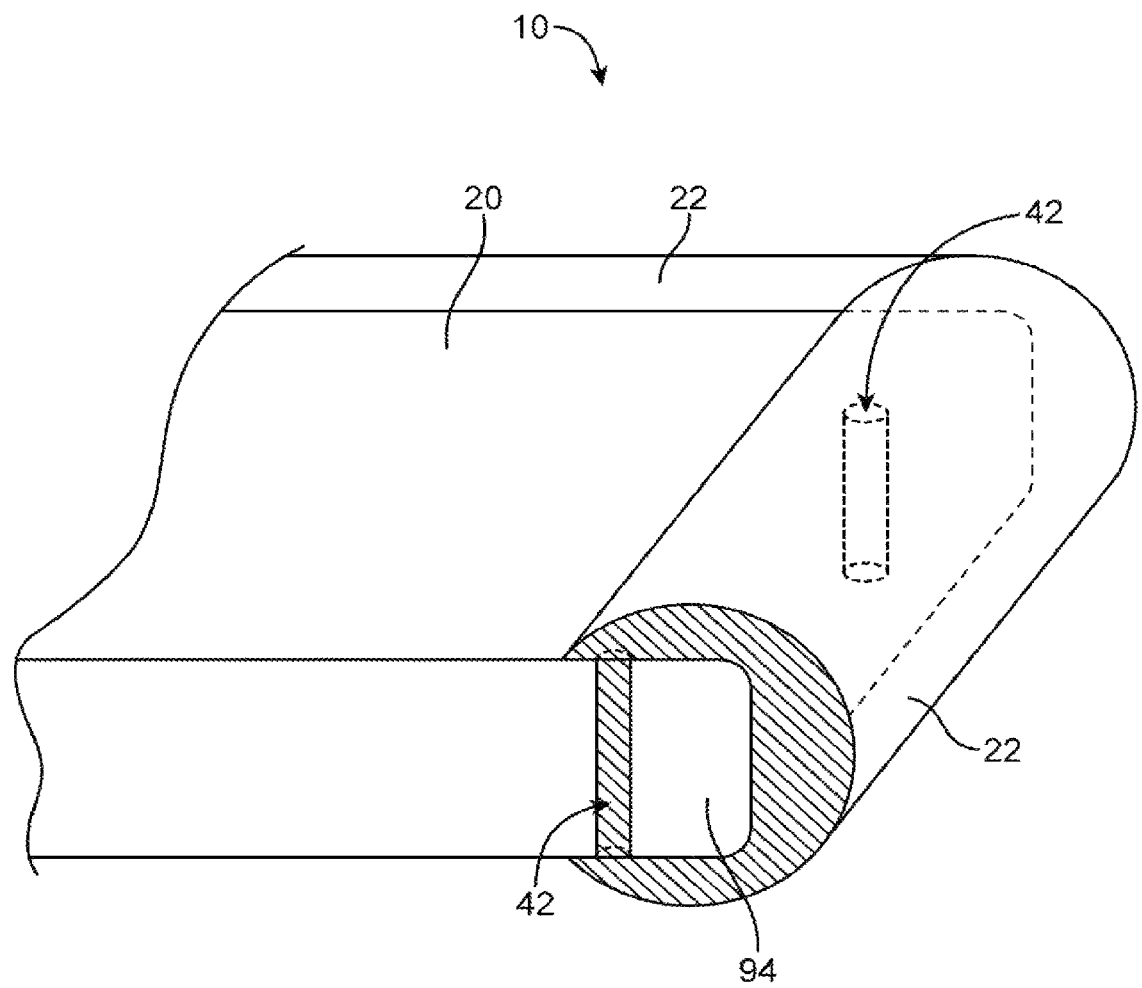
FIG. 18 is a perspective view of a portion of an illustrative structural glass support member that has a protective member on peripheral edge of structural glass support member having mounting holes in accordance with an embodiment of the present invention.

As shown in FIG. 18, a protective member such as peripheral member 22 may be formed on edge 94 of glass member 20 by molding (e.g., injection molding) peripheral member onto edge 94 and into mounting features such as holes 42 in glass member 20. Peripheral member 22 may be formed on one edge, two edges, three edges, four edges, or all edges of glass member 20. Peripheral member 22 may cover a portion of an edge such as edge 94 or may cover substantially all of an edge such as edge 94.

Figure 19:
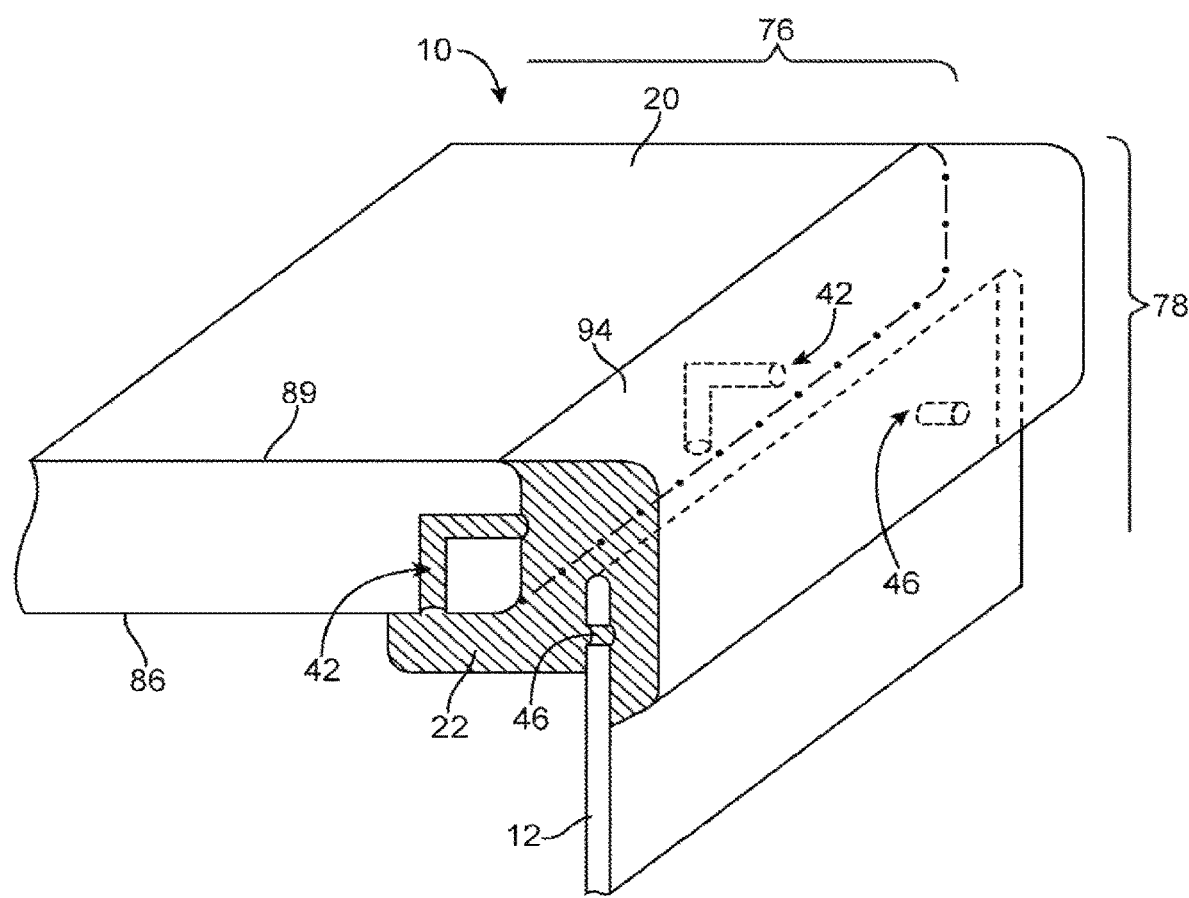
FIG. 19 is a perspective view of a portion of an illustrative electronic device in the vicinity of a mounting member at an interface between an enclosure and a structural glass support member that has mounting holes in accordance with an embodiment of the present invention.

FIG. 19 is a perspective view of a portion of device 10 having a peripheral member 22 that protects edge 94 of structural glass support member 20 and attaches enclosure 12 to structural glass support member 20. As shown in FIG. 19, structural glass support member 20 may include mounting features such as holes 42. Enclosure 12 may include openings such as holes 46. Peripheral member 22 may be attached to edge 94 of glass member 20 by molding peripheral member 22 into holes 42 in glass member 20 and holes 46 in enclosure 12. Peripheral member 22 may be molded so that a portion of peripheral member 22 is formed in holes 42 and holes 46. Portion 76 of glass member 20 of FIG. 19 may be a portion of top surface 60 or may be a portion of sidewall surface 62 of glass member 20. In configurations in which portion 76 is a portion of top surface 60 of device 10, portion 78 of enclosure 12 may be portion of bent portion 36 of enclosure 12 (see, e.g., FIG. 2). In configurations in which portion 76 is a portion of sidewall surface 62 of device 10, portion 78 of enclosure 12 may be portion of rear portion 38 of enclosure 12 (see, e.g., FIG. 2). In the example of FIG. 19, holes 42 have a portion that is parallel to surface 76 of glass member 20 and a portion that is perpendicular to surface 76 of glass member 20. This is merely illustrative.

Figure 20:
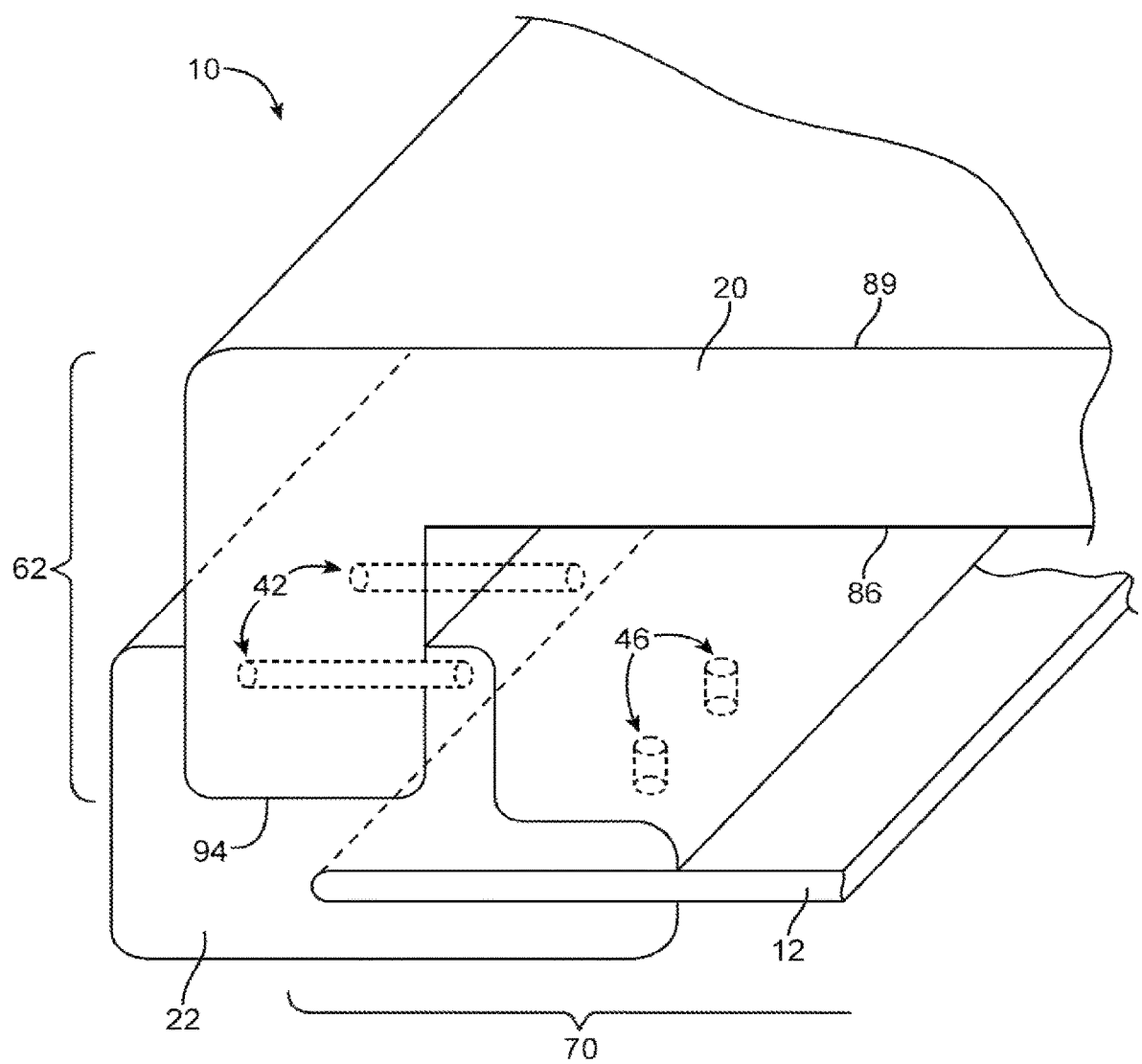
FIG. 20 is a perspective view of a portion of an illustrative electronic device in the vicinity of a mounting member at an interface between an enclosure having mounting holes and a structural glass support member that has mounting holes in accordance with an embodiment of the present invention.

If desired, holes 42 in glass member 20 may be substantially straight, as shown in FIG. As shown in FIG. 20, peripheral member 22 may help protect edge 94 of structural glass support member 20 and attach enclosure 12 to bent portion 62 of structural glass support member 20. In the example of FIG. 20, structural glass support member 20 may include mounting features such as holes 42. Enclosure 12 may include openings such as holes 46. Peripheral member 22 may be attached to edge 94 of glass member 20 by molding peripheral member 22 into holes 42 in glass member 20 and holes 46 in enclosure 12. Peripheral member 22 may be molded so that a portion of peripheral member 22 is formed in holes 42 and holes 46. Providing device 10 with a peripheral member such as peripheral member 22 that attaches glass member 20 to enclosure 12 is merely illustrative.

Figure 21:
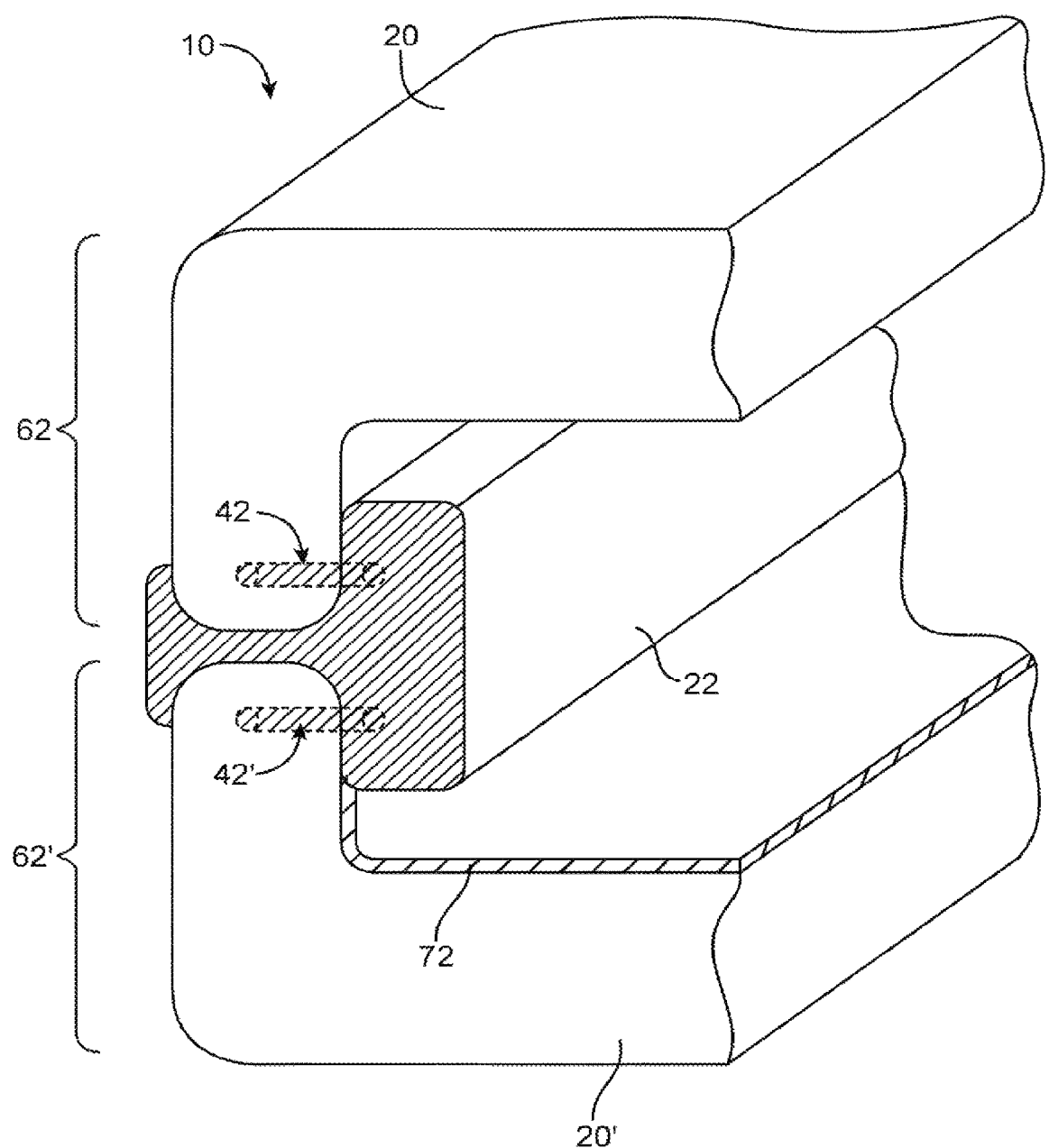
FIG. 21 is a perspective view of a portion of an illustrative electronic device in the vicinity of a mounting member at an interface between two structural glass support members that have mounting holes in accordance with an embodiment of the present invention.

If desired, peripheral member 22 may be used to attach structural glass support member to an additional glass member such as glass member 20' as shown in FIG. 21. In the example of FIG. 21, a glass member 20 and glass member 20' include mounting features such as holes 42 and 42' respectively. Peripheral member 22 may be molded so that portions of peripheral member 22 are formed in holes 42 and 42'. Forming portions of peripheral member 22 in holes 42 and 42' may form an attachment between glass members 20 and 20' respectively. In configurations in which device 10 is provided with a front glass member such as glass member and a rear glass member such as rear glass member 20', rear glass member 20' be provided with an opaque masking layer such as opaque masking layer 72. Opaque masking layer 72 may allow device 10 to have an outer surface that is substantially all glass while blocking internal components of device 10 from the view of a user of device 10.

The foregoing is merely illustrative of the principles of this invention and various modifications can be made by those skilled in the art without departing from the scope and spirit of the invention.

What is claimed is:

1. An electronic device comprising:
   a glass member defining:
   an exterior surface;
   an interior surface; and
   a peripheral surface that extends between the exterior surface and the interior surface;

a display positioned below the glass member;
a mounting feature coupled to the interior surface of the glass member;
a housing structure defining a rear surface of the electronic device; and
a molded peripheral member:
formed from an electrically insulating material;
at least partially surrounding the display; and
coupled to the housing structure and to the mounting feature such that at least a portion of the peripheral surface of the glass member is exposed.

2. The electronic device of claim 1, wherein:
the display is coupled to a first region of the interior surface; and
the mounting feature is coupled to a second region of the interior surface.

3. The electronic device of claim 2, wherein the mounting feature defines a flange.

4. The electronic device of claim 1, wherein:
the housing structure defines a plurality of mounting features; and
the molded peripheral member engages with the plurality of mounting features.

5. The electronic device of claim 4, wherein the plurality of mounting features defines a plurality of holes.

6. The electronic device of claim 1, wherein the display is a touch sensitive display.

7. The electronic device of claim 1, wherein the molded peripheral member exposes an entirety of the peripheral surface.

8. An electronic device comprising:
a display;
a front cover assembly positioned over the display and comprising:
a glass member defining a front surface of the electronic device and defining:
a central portion positioned over the display; and
a peripheral portion surrounding the central portion and defining an exterior surface, an interior surface, and a peripheral surface extending between the exterior surface and the interior surface; and
a mounting structure coupled to the peripheral portion of the glass member, the mounting structure comprising:
a mounting feature coupled to at least a portion of the interior surface of the peripheral portion; and
a peripheral member molded over the interior surface of the peripheral portion of the glass member and the mounting feature; and
a housing structure defining a rear surface of the electronic device and coupled to the front cover assembly.

9. The electronic device of claim 8, wherein:
the peripheral member is formed from an electrically insulating material; and
the peripheral member at least partially exposes the peripheral surface.

10. The electronic device of claim 9, wherein the electrically insulating material is a plastic material.

11. The electronic device of claim 9, wherein the electrically insulating material is a composite material.

12. The electronic device of claim 8, wherein the glass member defines:
a front wall of the electronic device that defines the central portion of the glass member; and
a portion of a side wall of the electronic device that at least partially defines the peripheral portion of the glass member.

13. The electronic device of claim 12, wherein:
the glass member further defines a curved transition between the front wall and the portion of the side wall; and
the display is a flexible display that extends under the curved transition.

14. The electronic device of claim 12, wherein:
the portion of the side wall is a first portion of the side wall; and
the housing structure defines a second portion of the side wall.

15. A mobile phone comprising:
a glass member defining a front surface, a rear surface opposite the front surface, and a peripheral surface extending between the front and the rear surfaces;
a display coupled to a first region of the rear surface that is positioned over the display;
a mounting feature coupled to the glass member in a second region of the rear surface that is coplanar with the first region of the rear surface;
a peripheral mounting structure formed of a molded material, the peripheral mounting structure:
at least partially encapsulating the mounting feature without encapsulating the peripheral surface; and
at least partially surrounding the display; and
a housing structure coupled to the glass member and coupled to the peripheral mounting structure.

16. The mobile phone of claim 15, wherein:
the glass member is a front glass member; and
the mobile phone further comprises a rear glass member.

17. The mobile phone of claim 16, wherein the rear glass member defines a planar region.

18. The mobile phone of claim 16, wherein:
the mobile phone further comprises an internal component that produces a radio frequency signal; and
each of the front glass member and the rear glass member is radio-transparent.

19. The mobile phone of claim 16, wherein the second region of the rear surface of the front glass member at least partially surrounds the first region of the rear surface.

20. The mobile phone of claim 15, wherein the molded material is a polymer material.

* * * * *